(12) United States Patent
Perry

(10) Patent No.: US 9,166,243 B2
(45) Date of Patent: Oct. 20, 2015

(54) FLOW BATTERY WITH INTERDIGITATED FLOW FIELD

(75) Inventor: Michael L. Perry, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 639 days.

(21) Appl. No.: 13/513,651

(22) PCT Filed: Dec. 18, 2009

(86) PCT No.: PCT/US2009/068681

§ 371 (c)(1),
(2), (4) Date: Jun. 4, 2012

(87) PCT Pub. No.: WO2011/075135

PCT Pub. Date: Jun. 23, 2011

(65) Prior Publication Data

US 2012/0244395 A1 Sep. 27, 2012

(51) Int. Cl.
*H01M 8/18* (2006.01)
*H01M 8/02* (2006.01)
*H01M 8/20* (2006.01)

(52) U.S. Cl.
CPC .............. *H01M 8/188* (2013.01); *H01M 8/026* (2013.01); *H01M 8/0265* (2013.01); *H01M 8/20* (2013.01); *H01M 8/0234* (2013.01); *Y02E 60/528* (2013.01)

(58) Field of Classification Search
CPC ... H01M 8/026; H01M 8/025; H01M 8/0247; H01M 8/0258; H01M 8/0265
See application file for complete search history.

(56) References Cited

U.S. PATENT DOCUMENTS 6,472,095 B2 * 10/2002 Margiott ........................ 429/513
2002/0086200 A1 7/2002 Margiott (Continued)

FOREIGN PATENT DOCUMENTS

| JP | 2003-217607 | * | 7/2003 | .............. H01M 8/02 |
| WO | WO 2005/057707 | * | 6/2005 | .............. H01M 8/04 |
| WO | 2009017150 | | 2/2009 | |

OTHER PUBLICATIONS

Chinese Search Report for CN Application No. 200980163036.9 mailed May 30, 2014.

(Continued)

*Primary Examiner* — Barbara Gilliam
*Assistant Examiner* — Angela Martin
(74) *Attorney, Agent, or Firm* — Carlson, Gaskey & Olds, P.C.

(57) ABSTRACT

A flow battery includes a first liquid-porous electrode, a second liquid-porous electrode spaced apart from the first liquid-porous electrode, and an ion-exchange membrane arranged between the first liquid-porous electrode and the second liquid-porous electrode. First and second flow fields are adjacent to the respective first liquid-porous electrode and second liquid-porous electrode. Each of the flow fields includes first channels having at least partially blocked outlets and second channels having at least partially blocked inlets. The second channels are interdigitated with the first channels. The flow fields provide a configuration and method of operation for relatively thin electrodes with moderate pressure drops and forced convective flow through the liquid-porous electrodes.

17 Claims, 3 Drawing Sheets

(56) References Cited

U.S. PATENT DOCUMENTS

| | | | |
|---|---|---|---|
| 2003/0087156 A1 | 5/2003 | Broman et al. | |
| 2003/0129468 A1 | 7/2003 | Issacci et al. | |
| 2004/0151960 A1 | 8/2004 | Rock | |
| 2008/0274393 A1* | 11/2008 | Markoski et al. | 429/41 |
| 2008/0292938 A1* | 11/2008 | Perry et al. | 429/34 |
| 2009/0136789 A1* | 5/2009 | Pien et al. | 429/13 |
| 2011/0223496 A1 | 9/2011 | Makita et al. | |

OTHER PUBLICATIONS

European Search Report and Written Opinion for European Application No. EP 09852396 completed on Oct. 24, 2013.

International Preliminary Report on Patentability for PCT/US2009/068681 dated Jun. 28, 2012.

International Search Report & Written Opinion dated Feb. 22, 2010.

* cited by examiner

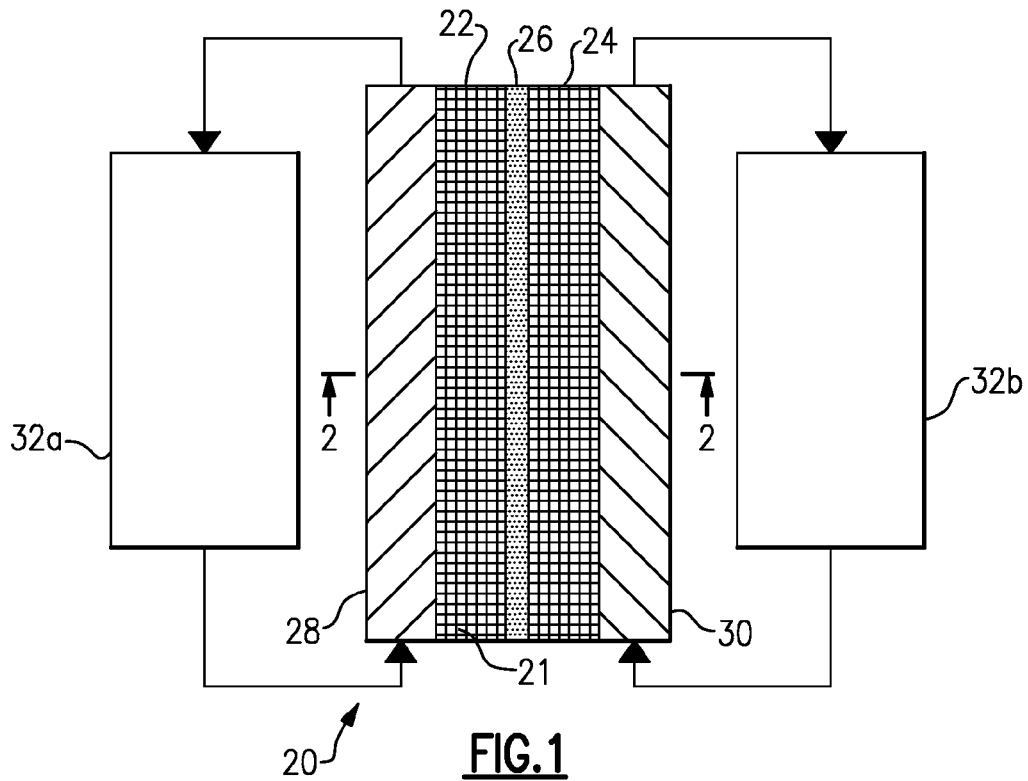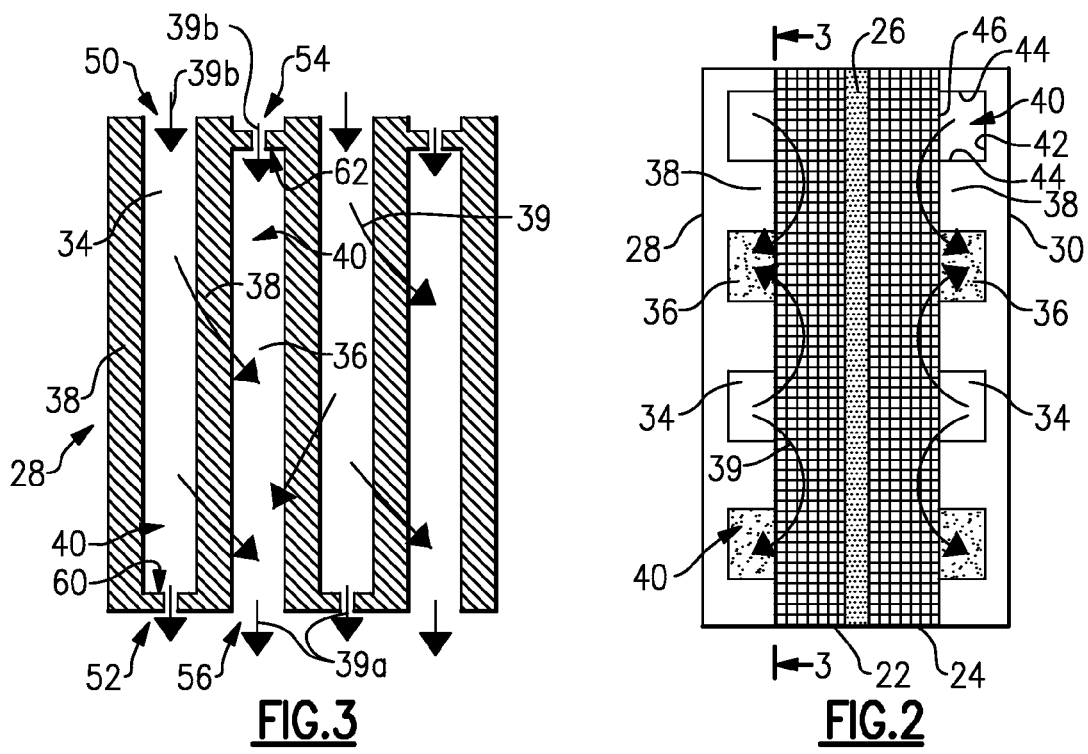

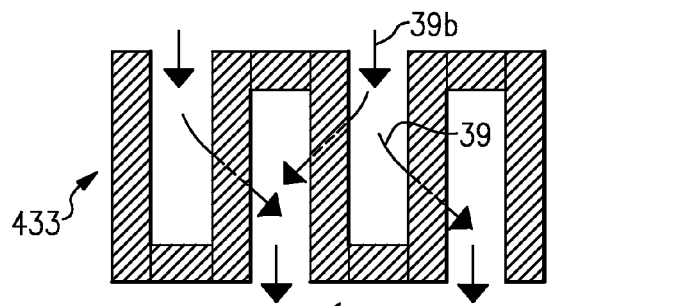
FIG.7
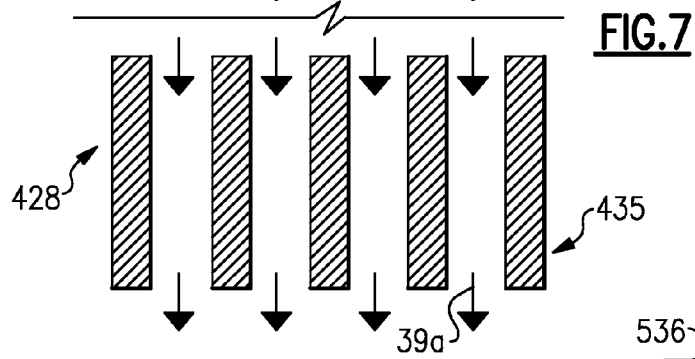
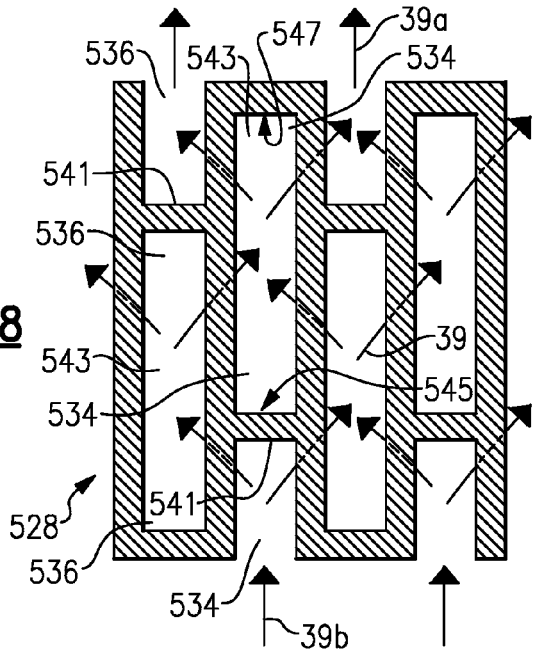
FIG.8
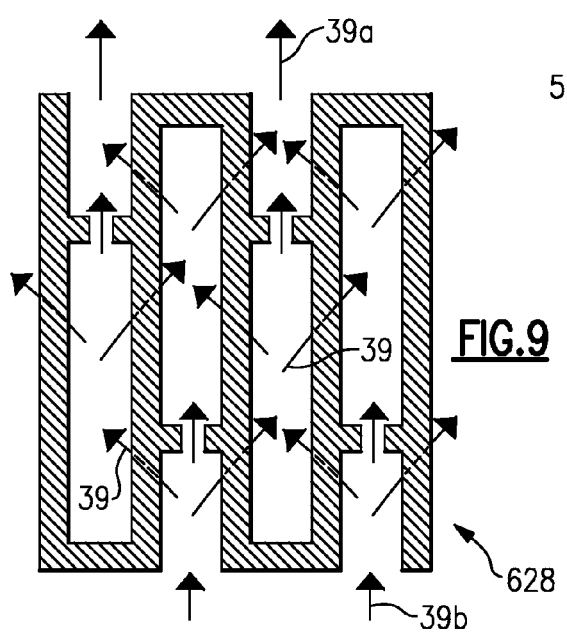
FIG.9

FLOW BATTERY WITH INTERDIGITATED FLOW FIELD

BACKGROUND

This application claims priority to International Application No. PCT/US2009/068681, filed Dec. 18, 2009.

BACKGROUND

This disclosure relates to flow batteries for selectively storing and discharging electric energy.

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A basic flow battery includes a redox flow cell having a negative electrode and a positive electrode separated by an ion-exchange membrane. A negative electrolyte is delivered to the negative electrode and a positive electrolyte is delivered to the positive electrode to drive an electrochemically reversible redox reaction. Upon charging, the electrical energy supplied causes a chemical reduction reaction in one electrolyte and an oxidation reaction in the other electrolyte. The ion-exchange membrane prevents the electrolytes from mixing but permits selected ions to pass through to complete the redox reactions. Upon discharge, the chemical energy contained in the electrolyte is released in the reverse reactions and electrical energy can be drawn from the electrodes.

SUMMARY

An exemplary flow battery includes a first liquid-porous electrode, a second liquid-porous electrode spaced apart from the first liquid-porous electrode, and an ion-exchange membrane arranged between the first liquid-porous electrode and the second liquid-porous electrode. First and second flow fields are adjacent to the respective first liquid-porous electrode and second liquid-porous electrode. Each of the flow fields includes first channels having at least partially blocked outlets and second channels having at least partially blocked inlets. The second channels are interdigitated with the first channels.

A method for use with the flow battery may include restricting flow of a liquid electrolyte through the first channels using the at least partially blocked outlets of the first channels to force flow of the liquid electrolyte through the adjacent respective first liquid-porous electrode or second liquid-porous electrode into an adjacent respective first liquid-porous electrode or second liquid-porous electrode into an adjacent second channel.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 1 illustrates an example flow battery.

FIG. 2 illustrates a cross-sectional view of the flow battery according to claim 1.

FIG. 3 illustrates a planar view of a flow field having interdigitated first and second channels with respective partially blocked outlets and inlets.

FIG. 7 illustrates another example flow field having one section with interdigitated channels and respective fully blocked outlets and inlets and another section having unobstructed channels.

FIG. 8 illustrates another example flow field having interdigitated first and second channels and fully blocked flow chambers.

FIG. 9 illustrates another example flow field having first and second interdigitated channels and partially blocked flow chambers.

DETAILED DESCRIPTION OF THE PREFERRED EMBODIMENT

Figure 4:
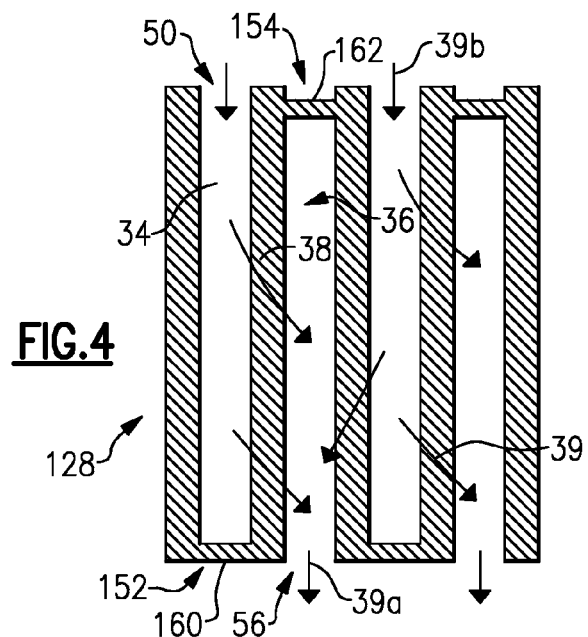
FIG. 4 illustrates a planar view of another flow field having interdigitated first and second channels with respective fully blocked outlets and inlets.

FIG. 1 illustrates selected portions of an example flow battery 20 for selectively storing and discharging electrical energy. As an example, the flow battery 20 may be used to convert electrical energy generated in a renewable energy system to chemical energy that can be stored until a later time at which there is demand for the electrical energy. The flow battery 20 may then convert the chemical energy into electrical energy for supply to an electric grid, for example.

In this example, the flow battery 20 includes a first liquid-porous electrode 22, a second liquid-porous electrode 24 spaced apart from the first liquid-porous electrode, and an ion-exchange membrane 26 arranged between the first liquid-porous electrode 22 and the second liquid-porous electrode 24. A first flow field 28 is located adjacent the first liquid-porous electrode 22 and a second flow field 30 is located adjacent to the second liquid-porous electrode 24. In some examples, multiple repetitions of the flow field/electrode/membrane/electrode/flow field "cell" may be considered to be a cell unit and may be used in a stacked arrangement. The flow battery 20 may also include a positive electrolyte storage tank 32a that is in fluid communication with the first flow field 28, and a negative electrolyte storage tank 32b that is in fluid communication with the second flow field 30.

The first liquid-porous electrode 22 and the second liquid-porous electrode 24 may be porous carbon members. For example, the porous carbon members may be fibrous carbon structures with catalytically active surfaces. In some cases, the catalytically active surfaces may be considered to be the carbon surfaces of the fibers because there is not a large energy barrier to the redox reactions of the cell. In other examples, a catalytic material 21, such as a noble metal or alloy, may be deposited onto the porous carbon member as the catalytically active surface.

In operation, the storage tanks 32a and 32b deliver electrolyte liquids to the respective first and second flow fields 28 and 30 to either convert electrical energy into chemical energy or convert chemical energy into electrical energy that can be discharged. The electrical energy is transmitted to and from the cell by an electrical pathway that completes the circuit and allows the completion of the electrochemical redox reactions, as is well known and is therefore not depicted here for clarity.

Referring to FIG. 2, each of the first and second flow fields 28 and 30 include first channels 34 and second channels 36 for delivering the electrolyte liquids to the respective electrodes 22 and 24. In this case, each of the first and second flow fields 28 and 30 are bipolar plates that define ribs 38 such that each channel 34 and 36 includes a flow passage 40 that extends between a bottom wall 42, two sidewalls 44, and an open top 46 that is directly adjacent to the respective electrode 22 or 24.

FIG. 3 illustrates a view of the first flow field 28 according to the section shown in FIG. 2. It is to be understood that the second flow field 30 may be identically configured. The second channels 36 are interdigitated with the first channels 34. In this example, the flow field 28 includes the first channels 34 having inlets 50 for receiving a liquid electrolyte and outlets 52 for discharging the liquid electrolyte. In this case, the first channels 34 have at least partially blocked outlets 52 for restricting flow of the liquid electrolyte within the first channels 34. Likewise, the second channels 36 include inlets 54 for receiving the liquid electrolyte and outlets 56 for discharging the liquid electrolyte. In this case, the inlets 54 of the second channels 36 are at least partially blocked to restrict flow of the liquid electrolyte into the second channels.

The outlets 52 of the first channels 34 include first obstruction members 60 that partially block the outlets 52 to restrict outflow of the liquid electrolyte, as represented by flow arrows 39a. Likewise, the inlets 54 of the second channels 36 include second obstruction members 62 that partially block inflow of the liquid electrolyte, as represented by flow arrows 39b, into the second channels 36. That is, the first and second obstruction members 60 and 62 extend into the flow passages 40 to restrict flow through the respective first and second channels 34 and 36. In this example, the first and second obstruction members 60 and 62 extend partially across the cross-sectional width of the first and second channels 34 and 36. Thus, the size of the obstruction members 60 and 62 may be designed to provide greater or lesser restriction of flow depending upon the needs of a particular application. As an example, the size of the obstruction members 60 and 62 may be represented by the percentage of the cross sectional area of the first and second channels 34 and 36 that is blocked. For instance, the obstruction members 60 and 62 may block less than 100 percent and more than zero percent of the cross-sectional area. In some examples, the obstruction members 60 and 62 may block approximately 70-90 percent of the cross-sectional area.

In operation, the liquid electrolyte flows into the inlets 50 of the first channels 34 and, to a lesser extent, into the second channels 36 through the inlets 54. The first obstruction members 60 of the first channels 34 restrict flow out of the first channels 34 and thereby force flow of the liquid electrolyte under the ribs 38 into adjacent second channels as represented generally by flow arrows 39 (see also FIG. 2). The liquid electrolyte thereby flows through the liquid-porous electrode 22 or 24. The liquid electrolyte then flows into the second channels 36 and exits from the outlets 56. The flow of the liquid electrolyte under the ribs 38 thereby provides a lower pressure drop than if the flow was entirely through the electrode (i.e., a no channel, flow-through arrangement), but still has the benefit of enhanced exposure of the liquid-electrolyte to the electrode via the forced flow under the ribs 38. Thus, since the electrodes 22 and 24 do not have to accommodate the full flow of the electrolytes, the electrodes 22 and 24 may be made relatively thin and may be less than 2 millimeters thick, or even 0.25-0.75 millimeters in thickness. The flow of the liquid electrolyte under the ribs 38 also provides improved transport of the liquid-electrolyte to the electrodes 22 or 24 relative to cells that use open flow channels adjacent to the electrode (i.e., a bipolar plate with open channels known as a flow-by arrangement). The example configuration thereby enables relatively thin electrodes 22 or 24 (with reasonable pressure drop) and forced convective transport of the reactants through the electrodes 22 or 24, and both of these features enable cells with higher performance. For examples, cells having the disclosed configurations may reduce ohmic losses and provide a power density of greater than 0.3 W/cm$^2$. By comparison, the power density of a conventional flow battery is typically 0.1 W/cm$^2$.

In this disclosure, like reference numerals designate like elements where appropriate, and reference numerals with the addition of one-hundred or multiples thereof designate modified elements. The modified elements are understood to incorporate the same benefits and/or features of the corresponding original elements. FIG. 4 illustrates a modified first flow field 128. In this case, first obstruction members 160 fully block the outlets 152 of the first channels 34, and second obstruction members 162 fully block the inlets 154 of the second channels 36.

Figure 5:
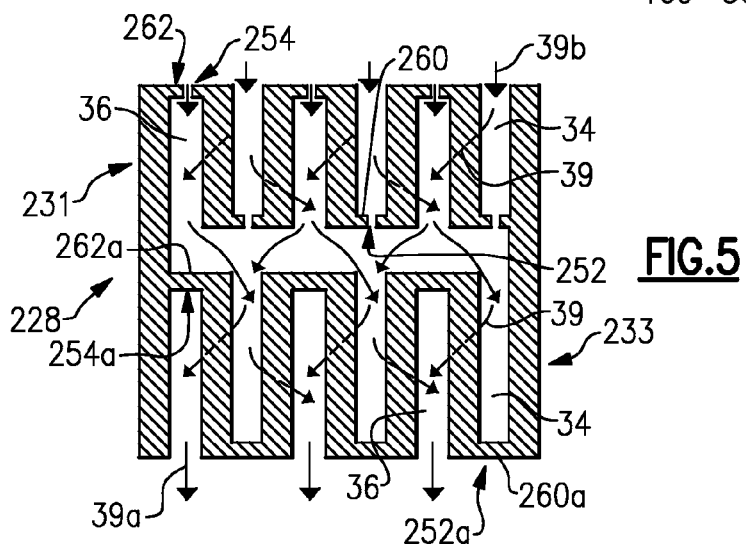
FIG. 5 illustrates another example flow field having one section with interdigitated first and second channels with respective partially blocked outlets and inlets adjacent to another section having first and second interdigitated channels with respective fully blocked outlets and inlets.

FIG. 5 illustrates another modified first flow field 228 having a first section 231 with first channels 34 that are interdigitated with second channels 36. In this case, the first section 231 includes first and second obstruction members 260 and 262 that respectively partially block the outlets 252 of the first channels 34 and the inlets 254 of the second channels 36, similar to the configuration shown in FIG. 3.

The first flow field 228 also includes a second section 233 having first channels 34 interdigitated with second channels 36. The first channels 34 include first obstruction members 260a that fully block the outlets 252a of the first channels 34, and second obstruction members 262a that fully block the inlets 254a of the second channels 36. In this case, the second section 233 is located downstream relative to the first section 231. However, in other examples, the second section 233 may be located upstream from the first section 231.

Figure 6:
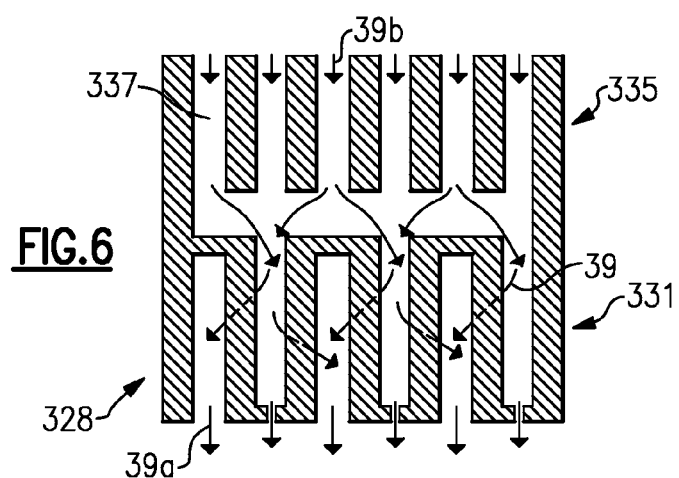
FIG. 6 illustrates another example flow field having one section with unobstructed channels and another section with first and second interdigitated channels with respective partially blocked outlets and inlets.

FIG. 6 shows another example first flow field 328 that includes a section 331 having partially blocked inlets of the second channels and partially blocked outlets of the first channels. The section 331 is located downstream from another section 335 having channels 337 that are unobstructed. In other examples, the section 331 may be located upstream from the section 335.

FIG. 7 illustrates another example first flow field 428 that includes a section 433 having first channels with fully blocked outlets and second channels with fully blocked inlets. The section 433 is located upstream relative to another section 435 having third channels that are unobstructed. In other examples, the section 435 may be located upstream relative to the section 433, which may be beneficial since the depleted reactants streams benefit more from the interdigitation.

FIG. 8 illustrates another example first flow field 528. In this example, the first channels 534 include fully blocked outlets and the second channels 536 include fully blocked inlets. However, each of the first channels 534 and the second channels 536 additionally includes at least one more obstruction member 541 such that the first and second channels 534 and 536 include flow chambers 543. Each of the flow chambers 543 includes a fully blocked chamber inlet 545 and a fully blocked chamber outlet 547.

In operation, the obstruction members within the flow field 528 restrict flow of the liquid electrolyte in the first channels 534 and force the liquid electrolyte to flow under the ribs, as represented by the flow arrows 39, into the adjacent liquid-porous electrode 22 or 24 into an adjacent second channel 536. In this case, the liquid electrolyte flows into the flow chamber 543 of the second channel 536. Since flow is also restricted within the flow chamber 543, the liquid electrolyte again is forced to flow under the ribs and into an adjacent first channel 534. In this case, the liquid electrolyte flows into the flow chamber 543 of the first channel 534. Again, the flow of the liquid electrolyte within the flow chamber 543 is restricted and the liquid electrolyte is forced under the ribs and into an adjacent second channel 536. The liquid electrolyte can then exit from the flow field 528 through the outlets of the second channels 536. In other examples, the illustrated configuration could be used as a section in combination with other sections disclosed herein.

FIG. 9 illustrates a modified first flow field 628 that is somewhat similar to the first flow field 528 of the previous example. In this case, the obstruction members only partially block the flow of the liquid electrolyte.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A redox flow battery comprising:
   a first liquid-porous electrode;
   a second liquid-porous electrode spaced apart from the first liquid-porous electrode;
   an ion-exchange membrane arranged between the first liquid-porous electrode and the second liquid-porous electrode;
   first and second flow fields adjacent the respective first liquid-porous electrode and second liquid-porous electrode, each of the first and second flow fields including first channels having at least partially blocked outlets and second channels having at least partially blocked inlets, and the second channels are interdigitated with the first channels; and
   a positive electrolyte storage tank connected in a positive recirculation loop with one of the first or second flow fields and a negative electrolyte storage tank connected in a negative recirculation loop with the other of the first or second flow fields.

2. The flow battery as recited in claim 1, wherein the first and second flow fields are respective bipolar plates, and the first channels and the second channels extend partially through the thickness of the respective bipolar plates such that each channel includes a bottom wall, two sidewalls and an open top that is adjacent to the respective first liquid-porous electrode or second liquid-porous electrode.

3. The flow battery as recited in claim 1, wherein the first channels and the second channels each define flow passages between elongated ribs, and the first channels include first obstruction members that at least partially block the outlets of the first channels and the second channels include second obstruction numbers that at least partially block the inlets of the second channels, and the first obstruction members and the second obstruction members extend into the flow passages.

4. The flow battery as recited in claim 1, wherein the first channels include first obstruction members that fully block the outlets of the first channels, and the second channels include second obstruction members that fully block the inlets of the second channels.

5. The flow battery as recited in claim 1, wherein the first and second flow fields further comprise third channels that are located either upstream or downstream relative to the first channels and the second channels, and the third channels are unobstructed.

6. The flow battery as recited in claim 1, wherein the first channels and the second channels each include chambers having at least partially blocked chamber inlets and at least partially blocked chamber outlets.

7. The flow battery as recited in claim 1, wherein the first channels and the second channels each include chambers having fully blocked chamber inlets and fully blocked chamber outlets.

8. The flow battery as recited in claim 1, wherein the first liquid-porous electrode and the second liquid-porous electrode are each porous carbon.

9. The flow battery as recited in claim 8, wherein the porous carbon includes a catalyst material.

10. The flow battery as recited in claim 1, wherein each of the first liquid-porous electrode and the second liquid-porous electrode have a thickness of less than 2 millimeters.

11. The flow battery as recited in claim 10, wherein the thickness is 0.25-0.75 millimeters.

12. The flow battery as recited in claim 1, wherein the first liquid-porous electrode, the second liquid-porous electrode, the ion-exchange membrane, and the first and second flow fields are a cell unit, and the flow battery includes a stack of the cell units.

13. A method for use with a redox flow battery, the method comprising
   providing a flow battery that includes a first liquid-porous electrode, a second liquid-porous electrode spaced apart from the second liquid-porous electrode, an ion-exchange membrane arranged between the first liquid-porous electrode and the second liquid-porous electrode, and first and second flow fields adjacent the respective first liquid-porous electrode and second liquid-porous electrode, each of the first and second flow fields including first channels having at least partially blocked outlets and second channels having at least partially blocked inlets, and the second channels are interdigitated with the first channels, a positive electrolyte storage tank connected in a positive recirculation loop with one of the first or second flow fields, and a negative electrolyte storage tank connected in a negative recirculation loop with the other of the first or second flow fields; and
   restricting flow of a liquid electrolyte through the first channels using the at least partially blocked outlets of the first channels to force flow of the liquid electrolyte though the adjacent respective first liquid-porous electrode or second liquid-porous electrode into an adjacent second channel.

14. The method as recited in claim 13, further comprising flowing the liquid electrolyte into a chamber in the adjacent second channel, the chamber having an at least partially blocked chamber inlet and an at least partially blocked chamber outlet.

15. The method as recited in claim 14, further comprising flowing the liquid electrolyte into an adjacent first channel from the second channel through the respective adjacent first or second liquid-porous electrode.

16. A redox flow battery comprising:
at least one cell including,
- a first liquid-porous electrode;
- a second liquid-porous electrode spaced apart from the first liquid-porous electrode;
- an ion-exchange membrane arranged between the first liquid-porous electrode and the second liquid-porous electrode; and
- a first flow field adjacent the first liquid-porous electrode opposite the ion-exchange membrane and a second flow field adjacent the second liquid-porous electrode opposite the ion-exchange membrane, each of the first and second flow fields including first channels having at least partially blocked outlets and second channels having at least partially blocked inlets, and the second channels are interdigitated with the first channels; and
- first and second electrolyte storage tanks connected in respective first and second recirculation loops with the at least one cell.

17. The flow battery as recited in claim 16, further comprising first and second electrolyte storage tanks external of the at least one cell and connected in respective first and second recirculation loops with the respective first and second liquid-porous electrodes.

\* \* \* \* \*

UNITED STATES PATENT AND TRADEMARK OFFICE
CERTIFICATE OF CORRECTION

| | |
|---|---|
| PATENT NO. | : 9,166,243 B2 |
| APPLICATION NO. | : 13/513651 |
| DATED | : October 20, 2015 |
| INVENTOR(S) | : Michael L. Perry |

It is certified that error appears in the above-identified patent and that said Letters Patent is hereby corrected as shown below:

IN THE CLAIMS:

In claim 3, column 5, line 67; delete "numbers" and insert --members--

In claim 13, column 6, line 42; delete "second" and insert --first--

In claim 13, column 6, line 60; delete "though" and insert --through--

In claim 17, column 7, line 25; prior to "first" insert --the--

Signed and Sealed this
Second Day of August, 2016

Michelle K. Lee
*Director of the United States Patent and Trademark Office*